(12) United States Patent
Williams

(10) Patent No.: US 7,678,164 B2
(45) Date of Patent: Mar. 16, 2010

(54) ASH HANDLING AND TREATMENT IN SOLID FUEL BURNERS

(75) Inventor: Paul D Williams, Hampstead, NC (US)

(73) Assignee: Salinas Energy Limited, Perth (AU)

( * ) Notice: Subject to any disclaimer, the term of this patent is extended or adjusted under 35 U.S.C. 154(b) by 1469 days.

(21) Appl. No.: 10/451,616

(22) PCT Filed: Jan. 9, 2002

(86) PCT No.: PCT/AU02/00024

§ 371 (c)(1),
(2), (4) Date: Jun. 20, 2003

(87) PCT Pub. No.: WO02/055635

PCT Pub. Date: Aug. 18, 2002

(65) Prior Publication Data

US 2004/0025437 A1 Feb. 12, 2004

(30) Foreign Application Priority Data

Jan. 9, 2001 (AU) .................................. PR 2461

(51) Int. Cl.
*C10J 3/72* (2006.01)
(52) U.S. Cl. ............................................ 48/66; 61/74
(58) Field of Classification Search ............... 48/61, 48/66, 71, 74, 77; 110/10, 18, 38, 186, 227, 110/257
See application file for complete search history.

(56) References Cited

U.S. PATENT DOCUMENTS

| | | | | |
|---|---|---|---|---|
| 2,049,668 A | * | 8/1936 | Skelly | 110/286 |
| 3,090,332 A | * | 5/1963 | Burbach et al. | 110/206 |
| 3,937,155 A | * | 2/1976 | Kunstler | 110/255 |
| 4,060,409 A | | 11/1977 | Ammann et al. | |
| 4,385,567 A | * | 5/1983 | Voss | 110/186 |
| 5,607,487 A | * | 3/1997 | Taylor | 48/111 |

FOREIGN PATENT DOCUMENTS

JP 11-006017 A 1/1999

OTHER PUBLICATIONS

Derwent Abstract Accession No. 85-305504/49, Class H09, JP 60-088091 (Babcock-Hitachi KK), May 17, 1985; Abstract.
Derwent Abstract Accession No. 92-076410/10, Class Q73, JP 04-020592 (Mitsubishi Heavy Ind KK), Jan. 24, 1992; Abstract.
International Search Report—PCT/AU02/00024; ISA/Australian Patent Office; Mar. 27, 2002.

* cited by examiner

*Primary Examiner*—Tom Duong
(74) *Attorney, Agent, or Firm*—Harness, Dickey & Pierce, P.L.C.

(57) ABSTRACT

A solid fuel gasifier includes first wall structure (12) defining a gasification chamber (14) and means (50, 52) to collect particulate solid residue from gasification in the gasification chamber. Second wall structure (16) defines a gas combustion chamber (17) and means (19) is arranged for admitting a flow of hot gases from the gasification chamber to the gas combustion chamber as combustion takes place. Also provided is means (178, 170) to conduct hot gases from the gasification chamber and/or gas combustion chamber into thermal contact with said collected particulate solid residue, for facilitating post-combustion and/or post-reduction of the solid residue. Also disclosed are an agitator bed (52, 182) for fine particulate material, and a method of gasification of solid fuel.

19 Claims, 5 Drawing Sheets

ASH HANDLING AND TREATMENT IN SOLID FUEL BURNERS

CROSS-REFERENCE TO RELATED APPLICATIONS

This application is a US National Stage of International Application No. PCT/AU02/00024, filed 09 Jan. 2002. This application claims the benefit of Australian Application No. PR 2461, filed 09 Jan. 2001. The disclosure(s) of the above applications are incorporated herein by reference.

FIELD OF THE INVENTION

This invention relates generally to solid fuel burners and has particular, though not exclusive, application to a solid fuel burner of the type commonly referred to as a gasifier or gasifier combustor.

BACKGROUND ART

A gasifier generally includes a primary combustion chamber into which solid fuel is loaded on to a grate structure. The fuel is first dried and gasified on the grate structure in a controlled primary combustion. The resultant gas is then transferred into a secondary combustion chamber, which may conveniently be a cycloburner, for secondary combustion to produce a high temperature relatively clean flue gas able to be used for a variety of purposes, eg. power generation or heating. There is a small residue of inorganic matter.

A gasifier of the general type to which the present invention relates is disclosed, for example, in U.S. Pat. No. 4,716,842, and the technology generally is of particular interest in waste recycling, especially with an emphasis on so-called "green power" generation. Specific solid fuels that may conveniently be gasified in this way include biological waste, agricultural biproducts, waste and biomass.

An objective of the present invention is to improve the processing of the solid residue recovered from the gasification process.

SUMMARY OF THE INVENTION

In a first aspect of the invention it has been appreciated that one way of achieving the objective is to bring the residue into thermal contact with off-gases recovered from the gasifier or secondary combustion chamber, preferably the latter, whereby to achieve an advantageous degree of post-combustion or post-reduction of the solid residue.

In accordance with the first aspect of the invention, therefore, there is provided a solid fuel gasifier including:
first wall structure defining a gasification chamber;
means to collect particulate solid residue from gasification in the gasification chamber;
second wall structure defining a gas combustion chamber;
means arranged for admitting a flow of hot gases from said gasification chamber to said gas combustion chamber as combustion takes place; and
means to conduct hot gases from said gasification and/or gas combustion chamber into thermal contact with said collected particulate solid residue, for facilitating post-combustion and/or post-reduction of the solid residue.

In the first aspect of the invention, there is further provided a solid fuel gasifier including:
first wall structure defining a gasification chamber, said wall structure including a floor on which particulate solid residue is accumulated during gasification in the chamber;
second wall structure defining a gas combustion chamber;
means arranged for admitting a flow of hot gases from said gasification chamber to said gas combustion chamber as combustion takes place; and
means to conduct hot gases from said gasification and/or gas combustion chamber through said floor, for superheating the floor and facilitating post-combustion and/or post-reduction of said accumulated solid residue thereon.

Preferably, said means to conduct the hot gases through the floor comprises multiple passages, eg. pipes, extending through or adjacent to the floor structure.

In a second aspect, the invention provides an agitator bed for fine particulate material, including:
a base surface for supporting the particulate material;
an array of agitator elements arranged adjacent to and dispersed over the base surface; and
means to reciprocate or otherwise move said agitator elements through said material on said base surface for agitating the material to encourage post-combustion and/or post reduction, and for effecting a net conveyance of the material in a predetermined direction;
wherein said agitator elements are shaped to present varying surface profiles to said material on said base surface that facilitate said net conveyance of the material in said predetermined direction.

Preferably, each of the agitator elements includes an asymmetrical triangular pyramidal base section which presents a streamlined face in one direction and a relatively more abutting face in the other. Advantageously, each agitator element further includes an enlarged head section atop the base section to further assist in parting the upper layers of the accumulated particulate material.

BRIEF DESCRIPTION OF THE DRAWINGS

The invention will now be further described, by way of example only, with reference to accompanying drawings, in which.

DESCRIPTION OF PREFERRED EMBODIMENTS

Figure 1:
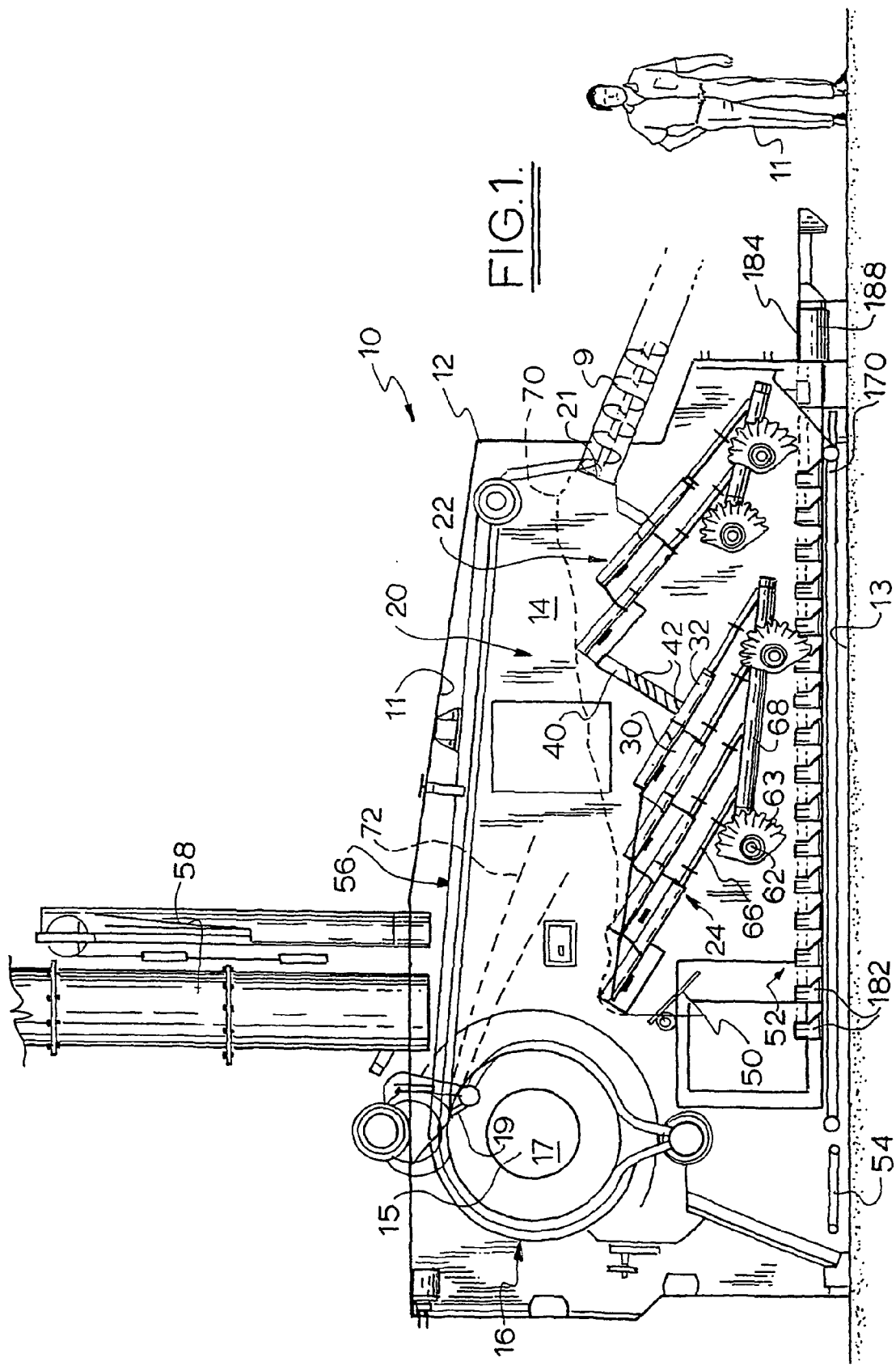
FIG. 1 is a diagrammatic vertical longitudinal section of a solid state gasifier incorporating an embodiment of both aspects of the invention.

The solid fuel gasifier 10 of FIG. 1 (which includes a figure of a man 11 to provide a dimensional context), includes an outer housing 12 about a primary combustion or gasification chamber 14 extending from a fuel delivery auger 9 towards a separately walled cycloburner 16 that defines a secondary gas combustion chamber 17. A grate structure 20 includes a preheating grate 22 adjacent the delivery end of auger 9, and, downstream in the overall direction of flow of the solid fuel, a gasifier grate 24. The two grates 22, 24 each include stepped pairs of fixed 30 and reciprocating 32 grate segments and are linked by a near vertical grate 40 with multiple angled and controllable openings 42 for admission of combustion air from below the grate structure into the fuel load above.

In general, solid fuel delivered via auger 9 accumulates as a deep load or burden 70 on the grate structure while being dried and preheated on grate 22 and gasified above grate 24. Combustible gas (syngas) is drawn through a transverse slot port 19 into chamber 17, from one end 15 of which is recovered combusted off-gas, flue gas or syngas useable for subsequent heating or power generating purposes. Inorganic solid residue or ash that falls over the downstream end of grate 24 is directed by a baffle device 50 onto an ash grate 52 arranged on the floor 13 of the housing. The ash is gradually agitated and moved along grate 52 while remaining carbon in the ash is oxidised to $CO_2$ and CO, for transverse removal and recovery by conveyor 54. This post-combustion of the remaining carbon is facilitated by heating floor 13.

An overhead water-cooled refractory lining 56 is suspended from the roof 11 of housing 10 and merges into the wall structure of cycloburner 16. Lining 56 also defines one edge of slot port 19 through which combustible gases pass from the primary chamber 14 to the secondary chamber 17. Roof 11 supports an emergency exhaust stack 58.

Figure 2:
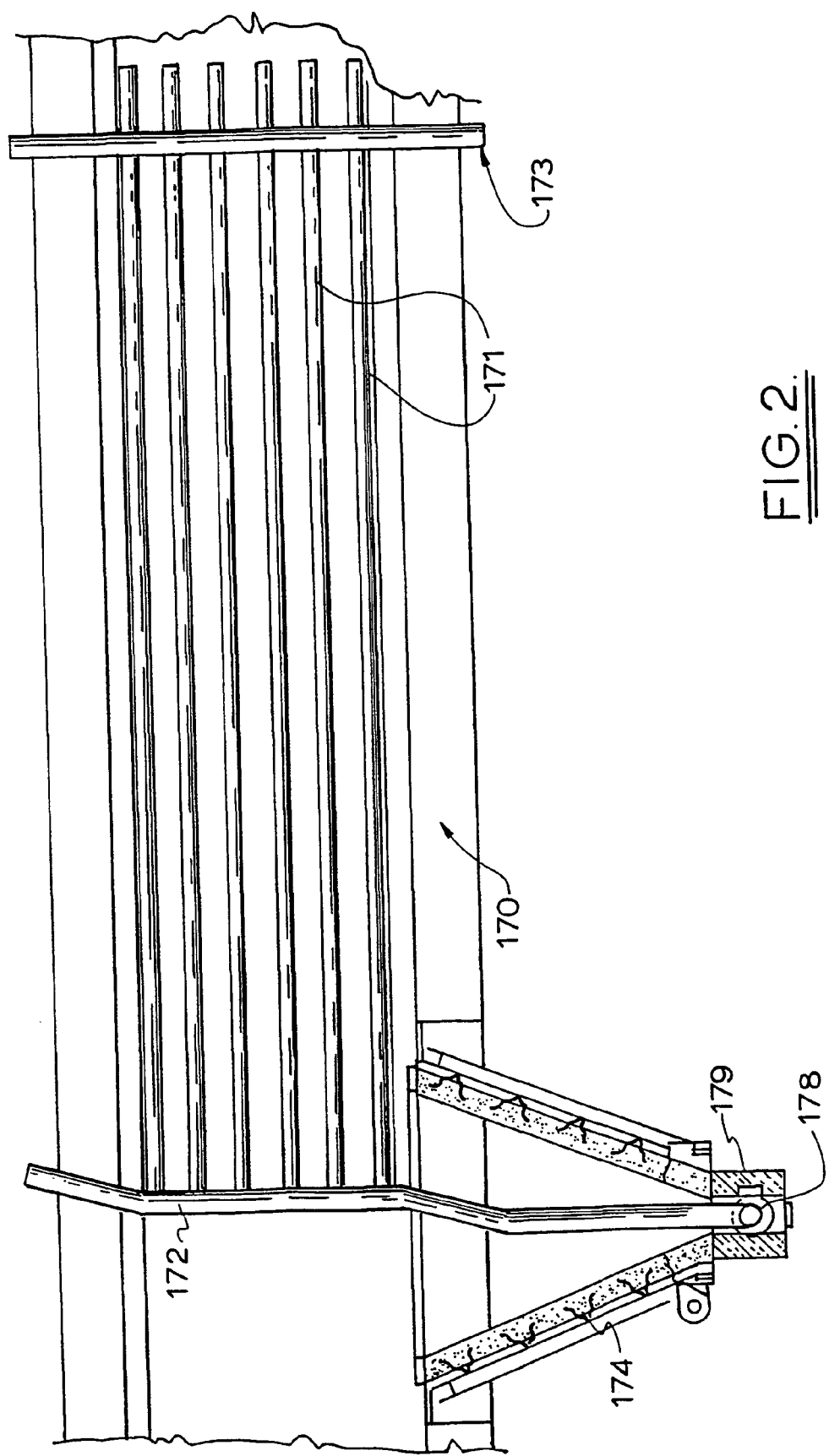
FIG. 2 is a diagrammatic plan view of the internal floor structure by which hot gases from the secondary or gas combustion chamber are recycled into thermal contact with solids residue in the primary or gasification chamber.
Figure 3:
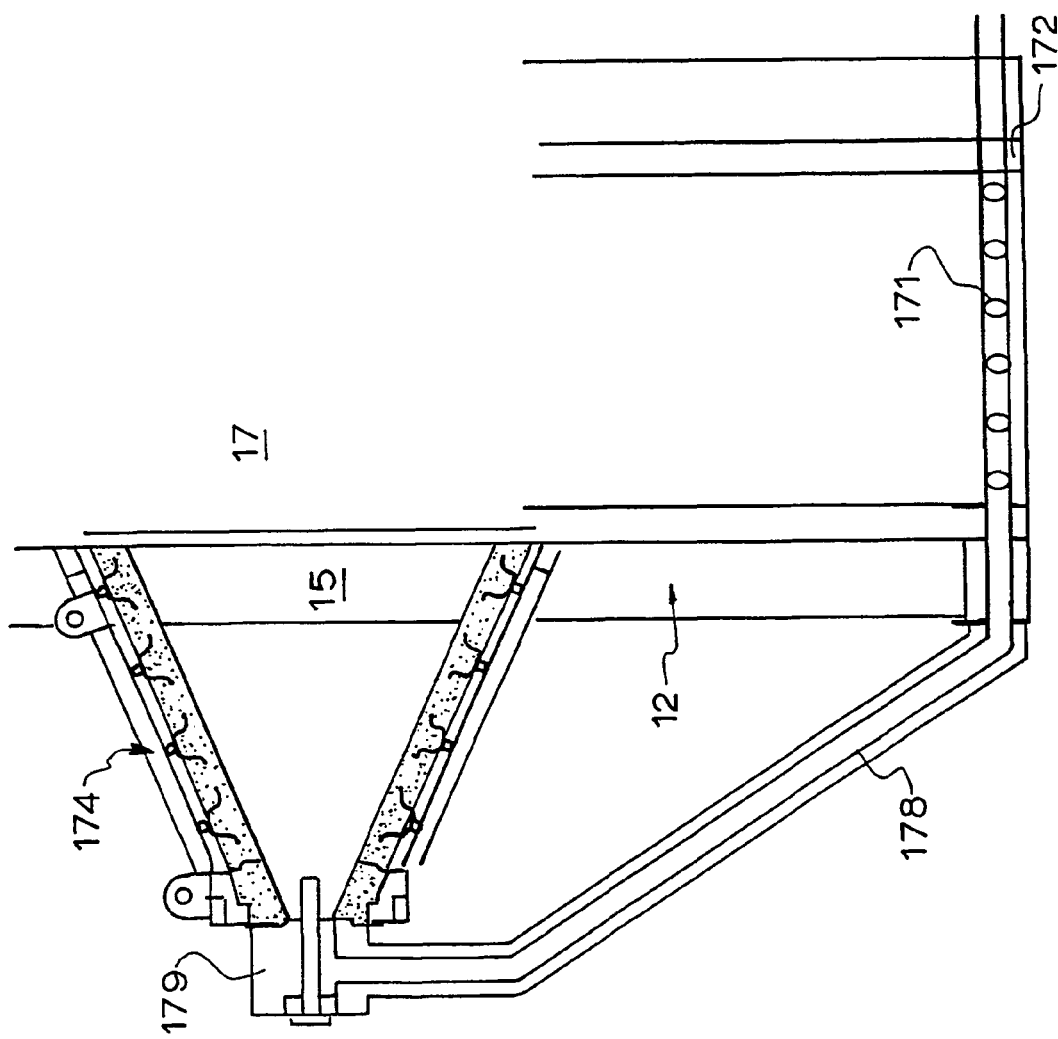
FIG. 3 is a view on the line 3-3 in FIG. 2.
Figure 4:
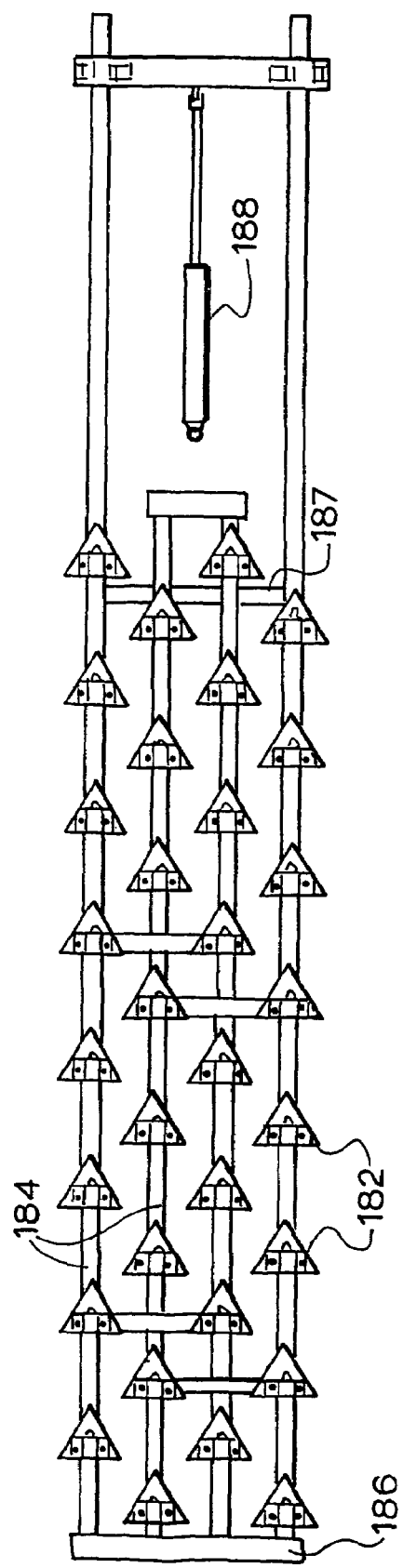
FIG. 4 is a plan view of the agitator bed on the floor.

Floor 13 of primary or gasification chamber 14 is heated by means of an internal array 170 (FIG. 2) of parallel ducts 171 extending between transverse tubular manifolds 172, 173 respectively at a position generally below cycloburner 16 and at the front end of housing 12 below fuel delivery auger 9. As seen in FIG. 3, transverse manifold 172 is at the feed or delivery end of this array 170 and is fed during operation of the burner with the off-gas from secondary or gas combustion chamber 17. This gas is recovered from chamber 17 via a vortex cone 174 (to separate out particulate content) fitted to the end wall of burner 16, and an inclined and insulated hot gas conduit 178. A substantially cylindrical extension 179 at the apex of vortex cone 174 links to conduit 178 and incorporates an eye glass 175.

Floor gas outlet manifold 173 is linked to a fan (not shown) in which the air is mixed with cool ambient air and/or flue gas to prevent fan overheat. The air mixture may be variously extracted for further use, or wholly or in part recycled to primary combustion or gasification chamber 14, for example via the grates 22, 24. In this way, where appropriate, an organic-contaminated stream from the cycloburner may be reinjected to the gasifier chamber to allow further gasification of the still contained carbonaceous material.

The recycled hot gases in the floor 13 are effective to superheat the floor and thereby superheat the solid residue which has dropped onto and accumulated on the floor. In this way, the residue, which is typically a fine particulate ash, is further treated by post-combustion or post-reduction wholly or at least in part.

In an advantageous form of the invention, a grate mechanism 52 is provided for agitating the ash on floor 13 to facilitate the post-combustion or post-reduction, while simultaneously slowly but progressively moving the material along the floor 13 to recovery conveyor 54.

Mechanism 52 essentially comprises a reciprocable grid on floor 13 that consists of multiple agitator elements 182 arranged in a diamond array on several longitudinally extending mounting bars 184. Bars 184 are fixed together by crossbars 186, 187 to form a framework that is reciprocated longitudinally of floor 13 by an actuator 188 located just forwardly of housing 12.

Figure 5:
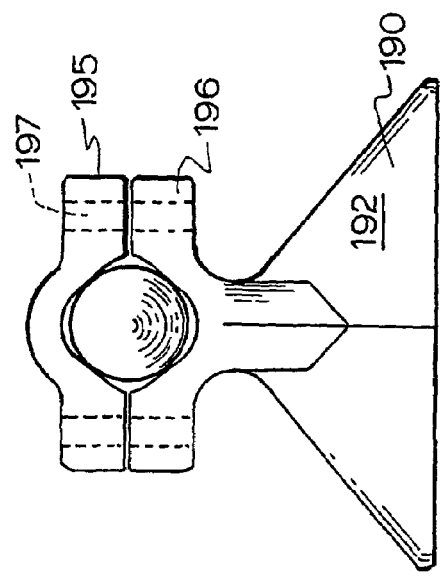
FIGS. 5, 6 and 7 are various views of an agitator element.
Figure 6:
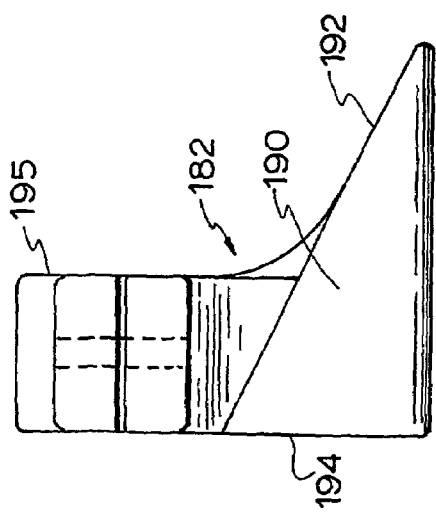
Figure 7:
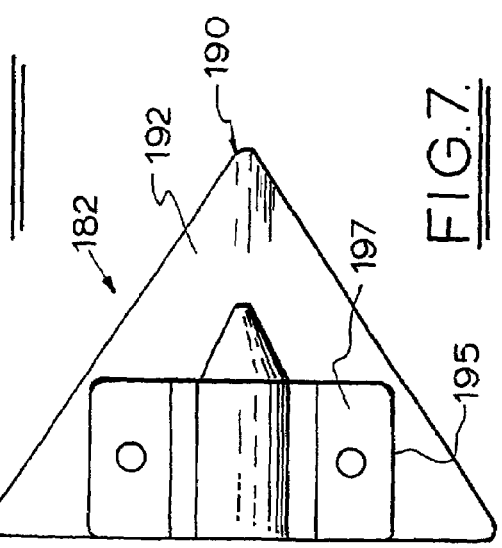

Agitator elements 182 are of similar form and are designed to part and stir the ash material when moved in the direction away from conveyor 54 but tend to move the ash material towards the conveyor when moved in the other direction. This is well achieved by the configuration depicted in FIGS. 5 to 7. Each agitator element 182 has a base section 190 of a symmetrical triangular pyramidal form, presenting a parting or streamlined face 192 when the element is moved away from conveyor 54, but presenting a vertically flat triangular face 194 towards the conveyor 54. Parting or streamlined face 192 preferably has lateral edges 50-75° (preferably about 65°) apart and a central inclination of 20-40° (preferably about 25°). A winged head section 195, made in two parts 196, 197 bolted together, further assists in combing through and agitating the upper layers of the ash layer.

In some cases, it has been found more appropriate for the ash material to be moved to a recovery conveyor at the opposite end of the furnace, ie. at the right in FIG. 1. In this event, the agitator elements need to be reversed to an orientation opposite to that shown in FIG. 1 ie. with face 194 facing to the right. This reversed direction of flow can, in some cases, be advantageous, for example by increasing the overall residence time of the ash on floor 13, thereby enhancing post-reduction and/or post combustion.

In a further modification, control of the process of post-combustion of the ash on floor 13 is enhanced by a facility to cool or limit the maximum temperature of the ash. For example, provision may be included to spray water onto the ash, and/or floor 13 may include an additional network of passages for cooling fluid, and/or water vapour or air may be selectively mixed into the gas flow of duct array 170. The latter may be achieved by recycling or mixing in vapour from gasification chamber 14. In another modification, air with or without added water vapour may be injected into the ash from locations on floor 13, eg. adjacent agitator elements 182 or via ducts within elements 182.

The invention claimed is:

1. A solid fuel gasifier including:
   first wall structure defining a gasification chamber;
   means to collect particulate solid residue from gasification in the gasification chamber;
   second wall structure defining a gas combustion chamber;
   means arranged for admitting a flow of hot gases from said gasification chamber to said gas combustion chamber as combustion takes place; and
   means to conduct hot gases from said gasification chamber and/or gas combustion chamber into thermal contact with said collected particulate solid residue, for facilitating post-combustion and/or post-reduction of the solid residue.

2. A solid fuel gasifier according to claim 1 wherein said means to collect particulate solid residue includes a floor of said wall structure, on which floor said particulate solid residue is accumulated during gasification in the chamber.

3. A solid fuel gasifier according to claim 2 wherein said gasification chamber further contains grate means on which solid fuel accumulates for gasification, and wherein said means to collect particulate solid residue further includes baffle means in said gasification chamber to direct to said floor particulate solid residue that falls from said grate means.

4. A solid fuel gasifier according to claim 1 wherein said means to conduct the hot gases through the floor comprises multiple passages extending through or adjacent to the floor structure.

5. A solid fuel gasifier according to claim 1 wherein said second wall structure is a cycloburner and said means to conduct hot gases includes conduit means to deliver off-gas from said gas combustion chamber into thermal contact with the collected particulate solid residue.

6. A solid fuel gasifier according to claim 1 further including an agitator bed for said particulate solid residue, including:
   a base surface for supporting the particulate solid residue;

an array of agitator elements arranged adjacent to and dispersed over the base surface; and means to reciprocate or otherwise move said agitator elements through said solid residue on said base surface for agitating the solid residue to encourage post-combustion and/or post reduction, and for effecting a net conveyance of the solid residue in a predetermined direction;

wherein said agitator elements are shaped to present varying surface profiles to said solid residue on said base surface that facilitate said net conveyance of the solid residue in said predetermined direction.

7. A solid fuel gasifier according to claim 6 wherein said base surface is a floor of said gasification chamber.

8. A solid fuel gasifier according to claim 6 wherein each of said agitator elements includes an asymmetrical triangular pyramidal base section which presents a streamlined face in one direction and a relatively more abutting face in the other.

9. A solid fuel gasifier according to claim 6 wherein each of said agitator elements includes an enlarged head section atop the base section to further assist in parting the upper layers of the accumulated particulate material.

10. A solid fuel gasifier according to claim 6 wherein said agitator elements are mounted on a reciprocable grid.

11. A solid fuel gasifier according to claim 1 further including means to deliver said gases, after said thermal contact with said collected particulate solid residue, into said gasification chamber.

12. A solid fuel gasifier according to claim 11, wherein said gasification chamber further contains grate means on which solid fuel accumulates for gasification, and said delivery means is arranged to deliver said gases into said gasification chamber via said grate means.

13. A solid fuel gasifier according to claim 1 further including means to apply a cooling medium to cool or limit the maximum temperature of said collected particulate solid residue, for enhanced control of said post-combustion and/or post-reduction thereof.

14. An agitator bed for fine particulate material, including:
a base surface for supporting the particulate material;
an array of agitator elements arranged adjacent to and dispersed over the base surface; and
means to reciprocate or otherwise move said agitator elements through said material on said base surface for agitating the material to encourage post- combustion and/or post reduction, and for effecting a net conveyance of the material in a predetermined direction;
wherein said agitator elements are shaped to present varying surface profiles to said material on said base surface that facilitate said net conveyance of the material in said predetermined direction.

15. A solid fuel gasifier according to claim 14, wherein each of said agitator elements includes an asymmetrical triangular pyramidal base section which presents a streamlined face in one direction and a relatively more abutting face in the other.

16. A solid fuel gasifier according to claim 15 wherein each of said agitator elements includes an enlarged head section atop the base section to further assist in parting the upper layers of the accumulated particulate material.

17. A solid fuel gasifier according to claim 14 wherein each of said agitator elements includes an enlarged head section atop the base section to further assist in parting the upper layers of the accumulated particulate material.

18. A solid fuel gasifier according to claim 16 wherein said agitator elements are mounted on a reciprocable grid.

19. A solid fuel gasifier according to claim 14 wherein said agitator elements are mounted on a reciprocable grid.

* * * * *